United States Patent
Mozaffari et al.

(10) Patent No.: US 11,991,529 B2
(45) Date of Patent: May 21, 2024

(54) UTILIZING NR GUARD BAND FOR EFFICIENT DEPLOYMENT OF LTE-M IN COEXISTENCE WITH NR

(71) Applicant: TELEFONAKTIEBOLAGET LM ERICSSON (PUBL), Stockholm (SE)

(72) Inventors: Mohammad Mozaffari, San José, CA (US); Yi-Pin Eric Wang, Fremont, CA (US); Johan Bergman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 17/290,903

(22) PCT Filed: Nov. 1, 2019

(86) PCT No.: PCT/IB2019/059406
§ 371 (c)(1),
(2) Date: May 3, 2021

(87) PCT Pub. No.: WO2020/089859
PCT Pub. Date: May 7, 2020

(65) Prior Publication Data
US 2021/0385663 A1 Dec. 9, 2021

Related U.S. Application Data

(60) Provisional application No. 62/755,194, filed on Nov. 2, 2018.

(51) Int. Cl.
*H04W 16/14* (2009.01)
*H04L 5/00* (2006.01)
*H04L 27/26* (2006.01)

(52) U.S. Cl.
CPC ........... *H04W 16/14* (2013.01); *H04L 5/0092* (2013.01); *H04L 27/26025* (2021.01); *H04L 27/2607* (2013.01)

(58) Field of Classification Search
CPC .................................................... H04W 16/14
See application file for complete search history.

(56) References Cited

U.S. PATENT DOCUMENTS 11,088,813 B2 * 8/2021 Park ....................... H04L 5/1469
2019/0342722 A1 * 11/2019 Lee ........................ H04W 4/80
(Continued)

OTHER PUBLICATIONS

3GPP, "3rd Generation Partnership Project; Technical Specification Group Radio Access Network; NR; Base Station (BS) radio transmission and reception (Release 15)", TS 38.104 V15.3.0, Sep. 2018.
(Continued)

*Primary Examiner* — Jason E Mattis
(74) *Attorney, Agent, or Firm* — Sage Patent Group

(57) ABSTRACT

In one aspect, a method for communicating in a wireless communication network includes transmitting or receiving (402) using an LTE-M carrier within the bandwidth of an NR carrier such that the LTE-M carrier overlaps at least a portion of NR guard band. The transmitting or receiving may be subject to aligning subcarriers in LTE-M and NR on the same grid and subject to raster placement. The LTE-M carrier may be positioned within the NR carrier so as to minimize the number of NR resource blocks occupied by the LTE-M carrier.

12 Claims, 11 Drawing Sheets

(56) References Cited

U.S. PATENT DOCUMENTS

2021/0227543 A1\* 7/2021 Wang ................ H04W 72/0453
2021/0307042 A1\* 9/2021 Shin ....................... H04L 5/0092
2021/0314851 A1\* 10/2021 Ratasuk ................ H04W 48/10
2022/0394680 A1\* 12/2022 Kim ....................... H04W 48/12

OTHER PUBLICATIONS

3GPP, "3rd Generation Partnership Project; Technical Specification Group Radio Access Network; NR; User Equipment (UE) radio transmission and reception; Part 1: Range 1 Standalone (Release 15)", TS 38.101-1 V15.3.0, Sep. 2018.

Ericsson, "Coexistence of LTE-MTC with NR", 3GPP TSG RAN WG1 Meeting #95, Tdoc R1-1812122, Nov. 12-17, 2018, Spokane, US.

Ericsson, "NR and LTE-M Coexistence", 3GPP TSG RAN WG1 Meeting #94bis , Tdoc T1-1810188, Oct. 8-12, 2018, Chengdu, China.

Ericsson, "On LTE MTC and NB-IoT RF co-existence with NR", TSG-RAN Working Group 4 (Radio) meeting #88, R4-1810077, Aug. 20-24, 2018, Gothenburg, Sweden.

Ericsson, "Way forward on the study scope of RF co-existence of LTE MTC and NB-IoT with NR", 3GPP Draft, R4-1810078, Aug. 10, 2018.

\* cited by examiner

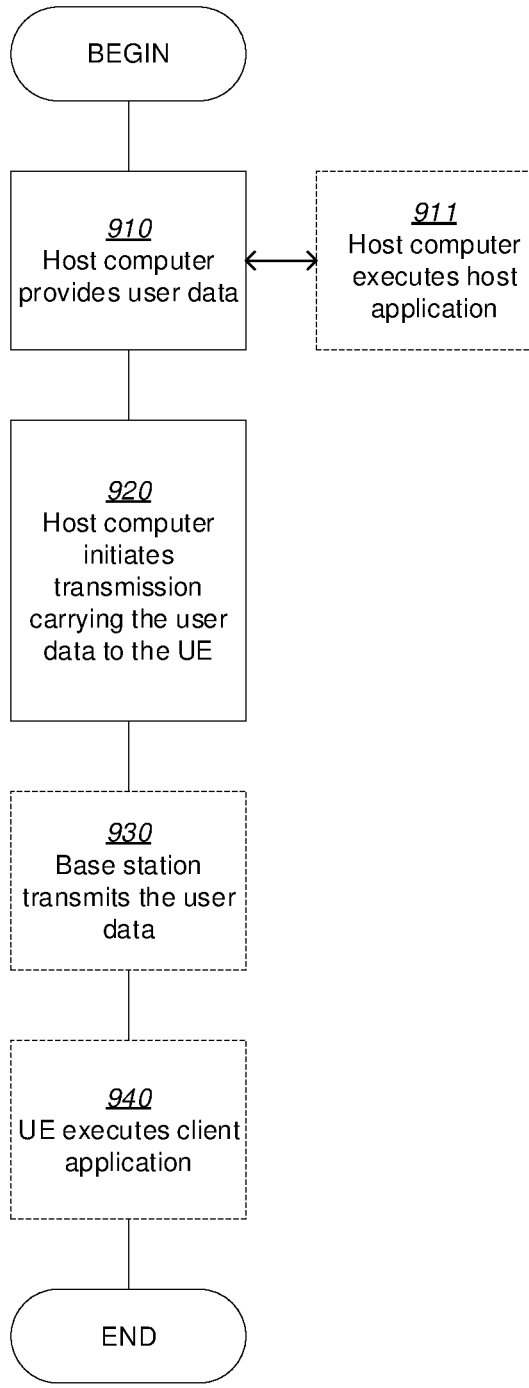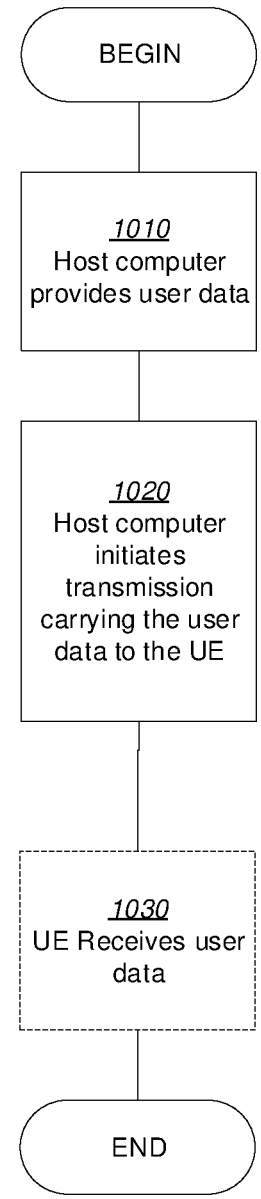
FIG. 9
FIG. 10

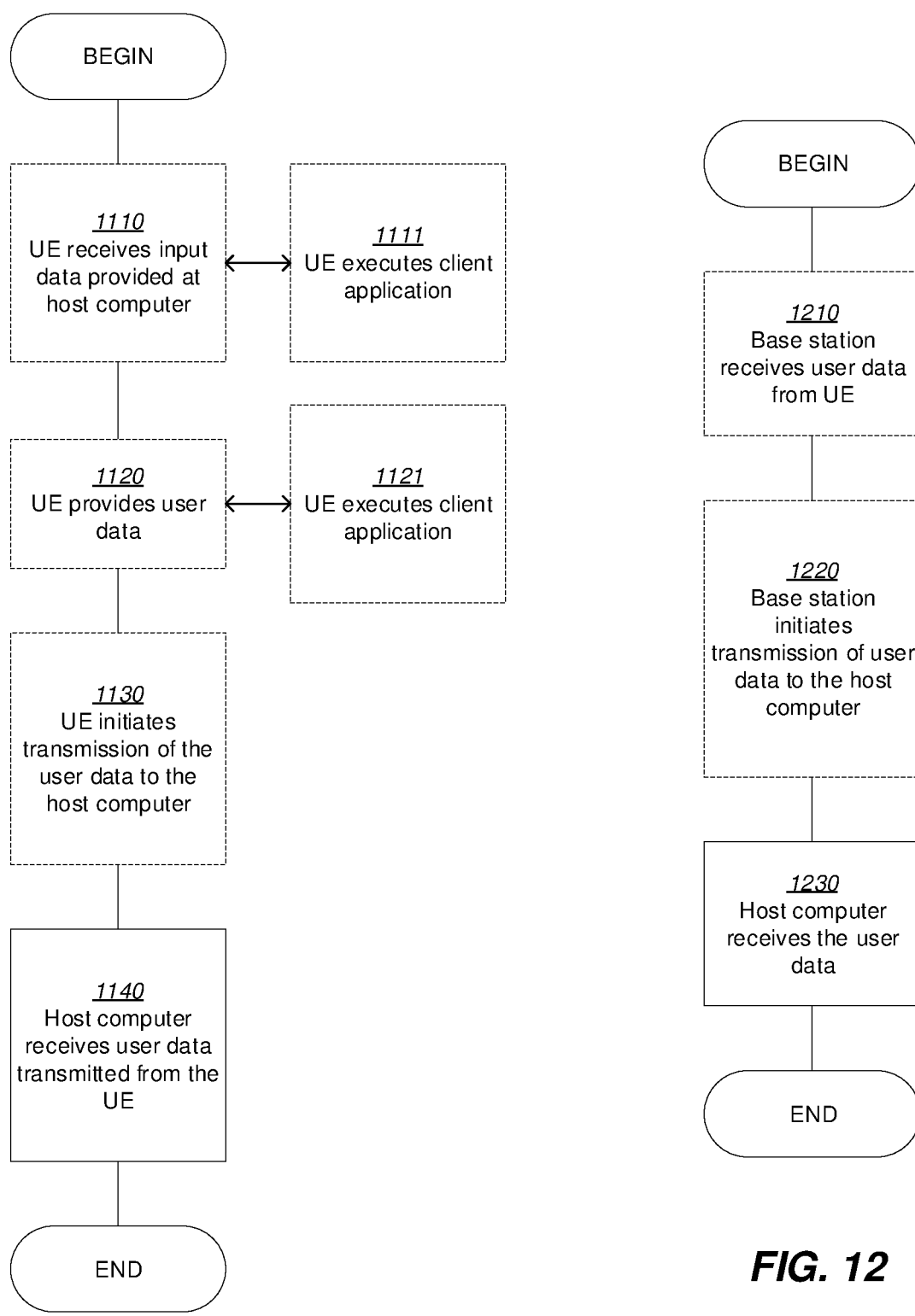

UTILIZING NR GUARD BAND FOR EFFICIENT DEPLOYMENT OF LTE-M IN COEXISTENCE WITH NR

RELATED APPLICATIONS

This application is a national stage application of International Patent Application No. PCT/IB2019/059406, filed Nov. 1, 2019, which claims priority to and the benefit of U.S. Provisional Application No. 62/755,194, filed on Nov. 2, 2018 and entitled "UTILIZING NR GUARD BAND FOR EFFICIENT DEPLOYMENT OF LTE-M IN COEXISTENCE WITH NR," the disclosures of which are incorporated in their entirety by reference.

TECHNICAL FIELD

The present disclosure generally relates to the field of wireless network communications, and more particularly, to deploying LTE-M in coexistence with New Radio (NR).

BACKGROUND

Machine-type communications (MTC) are widely used in many applications such as vehicle tracking, user and home security, banking, remote monitoring and smart grids. According to some reports, by 2023 there will be 3.5 billion wide-area devices connected to cellular networks. In this regard, LTE-M (also referred to as LTE-MTC or eMTC) networks are being rolled out at a fast pace, and it is foreseen that in the next few years, a massive number of devices will be connected to the networks, addressing a wide spectrum of LTE-M use cases.

Thanks to a design that enables 10-year battery lifetime of LTE-M devices, many of these devices will remain in service years after deployment. During the lifetime of these deployed LTE-M devices, many networks will undergo LTE to 5G New Radio (NR) migration. A smooth migration without causing service interruption to the deployed Internet-of-Things (IoT) devices is extremely important to mobile network operators (MNO). Furthermore, a migration solution that ensures superior radio resource utilization efficiency and superior coexistence performance between LTE-M and NR is highly desirable.

SUMMARY

Embodiments of the present invention provide for better coexistence of an LTE-M carrier inside an NR carrier. In general, if the LTE-M carrier can be placed in arbitrary places, satisfying the channel raster requirement of the LTE-M specifications would be easy. But, this degree of flexibility would require a guard band to be reserved within an NR carrier, to prevent interference between the two systems.

To deploy LTE-M inside an NR carrier, several NR resource blocks (RBs) need to be used for LTE-M. Depending on the channel bandwidths of NR and LTE-M, the number of NR RBs reserved for LTE-M can be significant. Moreover, the presence of the LTE-M DC subcarrier results in the usage of one extra NR RB. Therefore, in such a coexistence scenario, enhancing the resource efficiency is a key requirement. In fact, there is a need for an efficient mechanism for deployment of LTE-M inside NR such that while ensuring orthogonality between these two systems, resource utilization is also maximized.

Embodiments described herein provide a method of network devices operating according to a novel framework for deploying LTE-M inside the NR carrier, while using a portion of NR guard band to improve the resource utilization. Methodologies may be used to determine the position of an LTE-M carrier to be placed within an NR carrier, to ensure orthogonality between NR and LTE-M. To this end, the locations within the LTE-M carrier for which the NR and LTE-M subcarriers can be aligned need to be identified. In particular, what needs to be identified are the possible locations of LTE-M carrier center for which subcarrier grids alignment can be achieved and where the number of NR RBs in the LTE-M transmission band can be minimized. For various NR frequency bands with a specific number of RBs (or carrier bandwidths), the possible locations of LTE-M carrier centers will be determined as well as the number of NR RBs, which need to be reserved for accommodating the coexistence of NR and LTE-M.

The embodiments may ensure a subcarrier grid alignment that mitigates (or avoids) interference in NR and LTE-M coexistence. Moreover, the resource efficiency can be maximized by minimizing the number of NR resource blocks (in transmission band) used for LTE-M. For example, feasible locations for an LTE-M carrier (that ensure subcarrier grid alignment) are first determined based on the indexes of NR subcarriers. Then, based on the results of the first step, the possible locations for the LTE-M carrier center may be determined for when the LTE-M carrier uses a portion of the NR guard band. In this case, for various NR channel bandwidths, the locations of LTE-M carrier centers may be provided as well as the number of NR RBs that must be reserved for accommodating the coexistence of NR and LTE-M. Network devices then transmit or receive according to the LTE-M carrier positions determined with respect to the NR carrier.

According to some embodiments, a method for communicating in a wireless communication network includes transmitting or receiving using LTE-M carrier within the bandwidth of an NR carrier such that the LTE-M carrier overlaps at least a portion of NR guard band. The transmitting or receiving may be subject to aligning subcarriers in LTE-M and NR on the same grid and subject to raster placement. The LTE-M carrier may be positioned within the NR carrier so as to minimize the number of NR resource blocks occupied by the LTE-M carrier.

Further aspects of the present invention are directed to an apparatus, network node, base station, wireless device, user equipment (UE), network devices, MTC devices, computer program products or computer readable storage medium corresponding to the methods summarized above and functional implementations of the above-summarized apparatus and UE.

Advantages of the embodiments may include the effective deployment of LTE-M in coexistence with NR. More specially, the embodiments address problems of subcarrier grid alignment and resource efficiency, which are the key issues in the coexistence of NR and LTE-M. When deploying LTE-M inside an NR band, some embodiments may determine the best locations for an LTE-M carrier where subcarrier grids for NR and LTE-M are aligned, which mitigates (or eliminates) interference between these two systems. In addition, the embodiments may enhance the resource efficiency by exploiting a portion of the NR guard band for deploying the LTE-M carrier.

Of course, the present invention is not limited to the above features and advantages. Those of ordinary skill in the art will recognize additional features and advantages upon

BRIEF DESCRIPTION OF THE FIGURES

FIGS. 9 to 12 are flowcharts illustrating example methods implemented in a communication system including a host computer, a base station and a user equipment.

DETAILED DESCRIPTION

Exemplary embodiments of the present disclosure will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment can be tacitly assumed to be present/used in another embodiment. Any two or more embodiments described in this document may be combined with each other. The embodiments are described with respect to LTE-M and NR but can be adapted in other radio access technologies (RATs) where the techniques or selections may be relevant.

Figure 1:
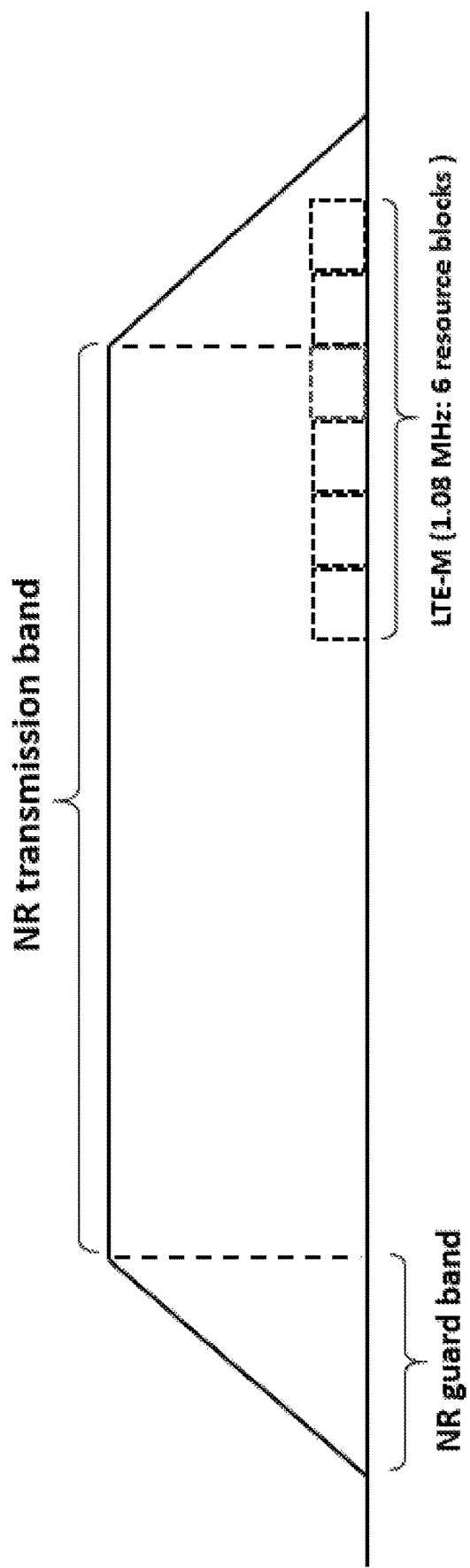
FIG. 1 illustrates an example of using the NR guard band for deploying LTE-M, according to some embodiments.

Embodiments described herein involve network devices that transmit and receive using an LTE-M system position within an 5G NR carrier that minimizes or eliminates the interference between the two systems. NR guard band is utilized to deploy LTE-M such that, while ensuring subcarrier grid alignment between NR and LTE-M, the number of NR resource blocks that need to be reserved for LTE-M is minimized. This general setup is illustrated in FIG. 1, showing the use of NR guard band for deploying LTE-M.

Table 1 lists the frequency bands that can be used by both NR and LTE-M. Also listed are the channel rasters that represent steps and frequencies that can be used by a UE to determine the radio frequency (RF) channel positions in the uplink and downlink. An LTE-M UE searches for LTE carriers on a 100 kHz channel raster and, thus, a feasible center frequency for UE can be expressed as 100*m, with m being an integer number.

TABLE 1

Frequency bands used by both NR and LTE-M.

| Band | Downlink (DL) | Raster [kHz] |
|---|---|---|
| 1 | 2110-2170 MHz | 100 |
| 2 | 1930-1990 MHz | 100 |
| 3 | 1805-1880 MHz | 100 |
| 5 | 869-894 MHz | 100 |
| 7 | 2620-2690 MHz | 100 |
| 8 | 925-960 MHz | 100 |
| 12 | 729-746 MHz | 100 |
| 20 | 791-821 MHz | 100 |
| 25 | 1930-1995 MHz | 100 |
| 28 | 758-803 MHz | 100 |
| 40 | 2300-2400 MHz | 100 |
| 41 | 2496-2690 MHz | NR: 15, 30, and LTE-M: 100 |
| 66 | 2110-2200 MHz | 100 |
| 71 | 617-652 MHz | 100 |

As seen in Table 1, except for band 41, the channel raster for bands that are common for NR and LTE-M is 100 kHz. Note that, while NR and LTE-M have different rasters in band 41, it is still possible to have aligned rasters. For instance, considering the fact that 20*15=3*100, the 20th point on the NR raster grid collocates with the 3rd point of the LTE-M raster grid.

There are several considerations to take into account. The raster defines a subset of RF reference frequencies that can be used to identify the RF channel position in the uplink and downlink. The RF reference frequency for an RF channel maps to a resource element on the carrier. Hereinafter, the channel raster is referred to as a point on the raster grid that defines the RF reference frequency. One NR RB in the frequency domain consists of 12 subcarriers. Note that an NR resource block is a one-dimensional measure spanning the frequency domain only, while an LTE PRB uses two-dimensional resource blocks of 12 subcarriers in the frequency domain and one slot in the time domain. The number of RBs is denoted by $N_{RB}$. The indexes of the middle RB for even and odd numbers of RBs are, respectively, $N_{RB}/2$ and $(N_{RB}1)/2$.

For NR carriers with an even number of RBs ($N_{RB}$), the channel raster is located at subcarrier index #0 in an RB with index $N_{RB}/2$. For NR carriers with an odd number of RBs, the channel raster is located at subcarrier index #6 in an RB with index $(N_{RB}-1)/2$.

Considering the fact that, in NR, the number of subcarriers is an even number, the carrier center is located between the two middle NR subcarriers. In this case, the NR carrier center frequency is related to the channel raster by:

$$F_C = F_{raster} - 7.5 \text{ kHz} \tag{1}$$

where $F_C$ is the NR carrier center frequency and $F_{raster}$ is the frequency where the NR channel raster is located.

Figure 2:
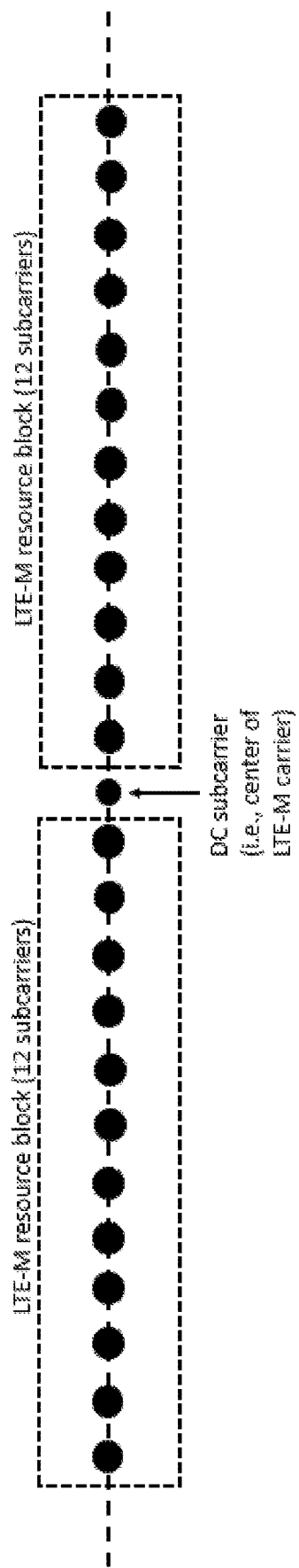
FIG. 2 illustrates a DC subcarrier in LTE-M, according to some embodiments.

In LTE-M, there is a subcarrier in the center of the downlink system bandwidth called the DC subcarrier, as shown in FIG. 2, which is an example of an even number of physical resource blocks (PRBs) within the LTE carrier. In this case, the LTE-M carrier center is placed on the DC subcarrier.

Now, one step is to find a condition under which NR and LTE-M subcarrier alignment in downlink is achieved. Let k be an integer that represents the NR subcarrier index relative to the NR channel raster (i.e., NR carrier). Clearly, the NR subcarriers are located at frequencies 100m+15k kHz. The possible locations for the LTE-M carrier can be given by 15k. Considering the fact that an LTE-M carrier (which is on the DC subcarrier) can be placed at 100n kHz (n is an integer), to achieve NR and LTE-M downlink subcarrier grid alignment, the equation should read:

$$100m+15k=100n$$

Let k* be the index of an NR subcarrier on which an LTE-M carrier can be placed. From the above equation, k* is in a set of all integer numbers generates by $$\frac{20m}{3}$$

which are given by:

$$k^* \in \{\ldots,-60,-40,-20,0,20,40,60,\ldots\} \quad (2)$$

Clearly, k*=20r, where r is an integer.

Prior to the utilization of the new communication framework by network devices, the positions for an LTE-M carrier center in relation to NR bandwidth may be determined as explained here.

Figure 3:
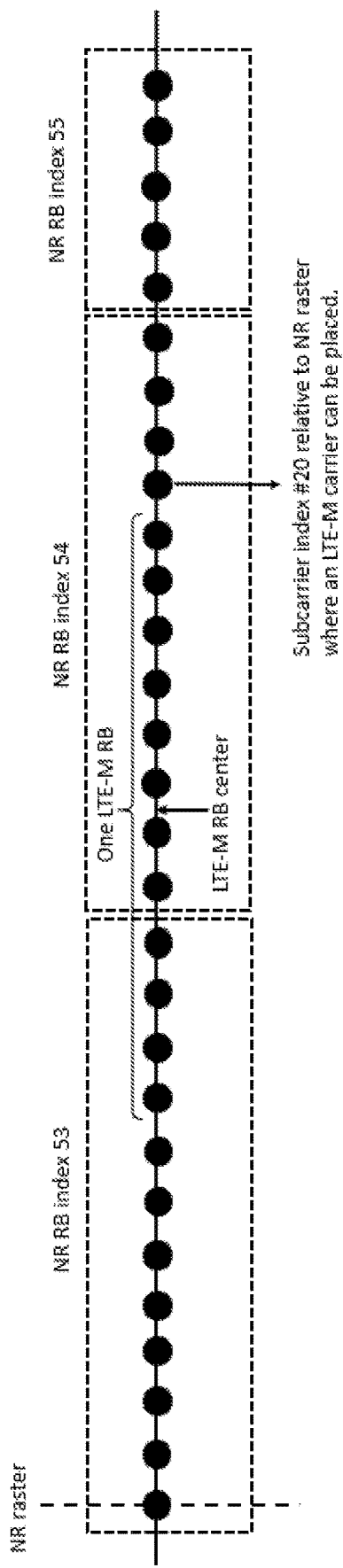
FIG. 3 illustrates subcarrier alignment in NR and LTE-M coexistence, according to some embodiments.

FIG. 3 shows an illustrative example in which the subcarriers are aligned in NR and LTE-M coexistence (for 20 MHz NR channel bandwidth). In the following, there are two cases corresponding to deploying LTE-M within an NR guard band. Clearly, an LTE-M carrier center frequency can be placed on the 15×k* [kHz] frequency relative to the channel raster. Therefore, using equation (1), the LTE-M carrier frequency relative to the NR carrier center C is:

$$C=15k^*+7.5, \text{kHz} \quad (3)$$

Let $B_{LT}$ be the operational bandwidth for LTE-M. Then, the minimum and maximum frequencies of LTE-M, relative to the NR carrier center, are given by:

$$L = C - \frac{B_{LT}}{2} = 15k^* + 7.5 - \frac{B_{LT}}{2}, \text{kHz, (minimum)} \quad (4)$$

$$U = C + \frac{B_{LT}}{2} = 15k^* + 7.5 + \frac{B_{LT}}{2}, \text{kHz, (maximum)} \quad (5)$$

In this case, under the following conditions, the entire LTE-M carrier is placed within the NR band:

$$U \leq \frac{B_{nr}}{2}, \text{ right side of the band (higher frequency side)} \quad (6)$$

$$L \geq \frac{-B_{nr}}{2}, \text{ left side of the band (lower frequency side)} \quad (7)$$

where $B_{nr}$ (in kHz) is the NR channel bandwidth.

Now, the goal is to find the possible location of the LTE-M carrier center for which LTE-M occupies a portion of the NR guard band. Let α be the portion of the channel bandwidth that is used for guard band (on both sides of the spectrum). In this case, the following condition for the right side of the NR band is as follows:

$$U - \frac{(1-\alpha)B_{nr}}{2} > 0 \rightarrow 15k^* + 7.5 + \frac{B_{LT}}{2} - \frac{(1-\alpha)B_{nr}}{2} > 0 \quad (8)$$

Based on (6) and (8), the possible locations of the LTE-M carrier center can be on the following NR subcarriers:

$$\frac{(1-\alpha)B_{nr} - B_{LT} - 15}{30} \leq k^* \leq \frac{B_{nr} - B_{LT} - 15}{30}, \quad (9)$$

(right side of the band)

For left side of the NR band we have:

$$-\frac{(1-\alpha)B_{nr}}{2} - L > 0 \rightarrow -\frac{(1-\alpha)B_{nr}}{2} - \left(15k^* + 7.5 - \frac{B_{LT}}{2}\right) > 0 \quad (10)$$

Using (7) and (9) leads to:

$$\frac{B_{LT} - B_{nr} - 15}{30} < k^* \leq \frac{B_{LT} - (1-\alpha)B_{nr} - 15}{30}, \quad (11)$$

(left side of the band)

For 5, 10, 15, 20, 25, 30, 40, and 50 MHz NR channel bandwidths, and 15 kHz subcarrier spacing, the guard bands are as shown in Table 2.

TABLE 2

Guard band for different NR channel bandwidths for 15 kHz subcarrier spacing.

| Channel bandwidth | Guard band on each side (kHz) | α (portion of the channel bandwidth for guard band on both sides) |
|---|---|---|
| 5 MHz | 242.5 | 0.097 |
| 10 MHz | 312.5 | 0.0625 |
| 15 MHz | 382.5 | 0.051 |
| 20 MHz | 452.5 | 0.04525 |
| 25 MHz | 522.5 | 0.0418 |
| 30 MHz | 592.5 | 0.0395 |
| 40 MHz | 552.5 | 0.027625 |
| 50 MHz | 692.5 | 0.0277 |

The equation ω>0 can be used to denote the amount of NR guard band (in kHz) occupied by the LTE-M carrier. In this case, the number of NR resource blocks (in NR transmission band) occupied (fully or partially) by LTE-M carrier can be calculated by:

$$N = \left\lceil \frac{B_{LT} - \omega}{180} \right\rceil \quad (12)$$

where ⌈.⌉ is the ceiling function. For example, for $B_{LT}$=1.08 MHz (6 PRBs) LTE-M channel bandwidth and 20 MHz NR bandwidth, the possible locations of the LTE-M carrier center are:

$$\frac{18000}{30} < k^* \leq \frac{18905}{30} \quad (13)$$

Hence, k* should satisfy:

$$600 < k^* \leq 630.1 \quad (14)$$

where k* is the index of NR subcarrier (relative to NR raster) on which the LTE-M carrier can be placed. Now, given (2) and (14), k*∈{620}, for the right side of the band.

Likewise, for the left side of the band we have:

$$-631.1 < k^* \leq -601, \text{ (left side of the band)} \quad (15)$$

Given (2) and (15), $k^* \in \{-620\}$, for the left side of the band. Therefore, for $k^* \in \{-620, 620\}$, there will be subcarrier grid alignment between NR and LTE-M. More over, a portion the LTE-M carrier is placed inside the NR guard band.

Subsequently, the amount of NR guard band which is occupied by LTE-M is given by:

$$\omega = U - \frac{(1-\alpha)B_{nr}}{2} = 15k^* + 7.5 + \frac{B_{LT} - (1-\alpha)B_{nr}}{2}, \quad (16)$$
(right side of the band)

$$\omega = -\frac{(1-\alpha)B_{nr}}{2} - L = \frac{B_{LT} - (1-\alpha)B_{nr}}{2} - 15k^* - 7.5, \quad (17)$$
(left side of the band)

for $k^*=620$: $\omega=300$ kHz (which is equivalent to 20 subcarriers). Also, the number of NR resource blocks occupied (fully or partially) by LTE-M carrier is:

$$N = \left\lceil \frac{B_{LT} - \omega}{180} \right\rceil = \left\lceil \frac{1080 \text{ kHz} - 300 \text{ kHz}}{180} \right\rceil = 5,$$

for $k^*=-620$: $\omega=285$ kHz (which is equivalent to 19 subcarriers). Also, the number of NR resource blocks which is occupied (fully or partially) by LTE-M carrier is:

$$N = \left\lceil \frac{B_{LT} - \omega}{180} \right\rceil = \left\lceil \frac{1080 \text{ kHz} - 285 \text{ kHz}}{180} \right\rceil = 5$$

Note that due to the presence of the LTE-M DC subcarrier, one additional NR resource block needs to be used for LTE-M. Hence, for a 1.08 MHz LTE-M channel bandwidth, 7 (=6+1) NR resource blocks must be used for the coexistence. In this case, to deploy the LTE-M inside NR, we only need to reserve 5 NR RBs rather than 7. Clearly, the number of occupied NR resource blocks (in NR transmission band) can be minimized by maximizing co.

The process for determining the LTE-M carrier center frequency may be summarized into a few steps. A first step may include determining candidate locations for the LTE-M carrier from among multiple LTE carrier locations, based on where subcarriers of the NR carrier align with subcarriers of the LTE-M carrier. The candidate locations for the LTE-M carrier may be determined by searching among multiple LTE carrier locations on a 100 kHz channel raster. A second step may include determining, from the candidate locations, the LTE-M carrier center, where at least a portion of the LTE-M carrier deploys in a guard band of the NR carrier. The network devices may then transmit or receive according to the LTE-M carrier center frequency.

The determined LTE-M locations are identified in the tables below. In Tables 3 through 10, for various NR channel bandwidths, several pieces of information are provided. The first column includes indexes of NR subcarriers (relative to NR raster) where the LTE-M carrier center can be placed. Here, subcarrier grid alignment is achieved for NR and LTE-M coexistence. Furthermore, a portion of NR guard band is used for efficient deployment of LTE-M. The second column shows the amount of NR guard band which is used by LTE-M. The third column shows the number of NR resource blocks in NR transmission band used by LTE-M. The fourth column shows a portion of the NR guard band used for LTE-M.

TABLE 3

Using NR guard band for deploying LTE-M (5 MHz NR channel bandwidth)

| Index of NR subcarrier (relative to NR raster) for placing LTE-M carrier center (i.e. the D.C. subcarrier) | Amount of NR guard band occupied by LTE-M ($\omega$) [kHz] | Number of NR resource blocks (in transmission band) used for LTE-M (N) | Portion of the NR guard band used for LTE-M |
|---|---|---|---|
| 120 | 90 kHz (=6 subcarriers) | 6 | 0.37 |
| −120 | 75 kHz (=5 subcarriers) | 6 | 0.31 |

TABLE 4

Using NR guard band for deploying LTE-M (10 MHz NR channel bandwidth)

| Index of NR subcarrier (relative to NR raster) for placing LTE-M carrier center | Amount of NR guard band occupied by LTE-M ($\omega$) [kHz] | Number of NR resource blocks (in transmission band) used for LTE-M (N) | Portion of the NR guard band used for LTE-M |
|---|---|---|---|
| 280 | 60 kHz (=4 subcarriers) | 6 | 0.19 |
| −280 | 45 kHz (=3 subcarriers) | 6 | 0.14 |

TABLE 5

Using NR guard band for deploying LTE-M (15 MHz NR channel bandwidth)

| Index of NR subcarrier (relative to NR raster) for placing LTE-M carrier center | Amount of NR guard band occupied by LTE-M (ω) [kHz] | Number of NR resource blocks (in transmission band) used for LTE-M (N) | Portion of the NR guard band used for LTE-M |
|---|---|---|---|
| 440 | 30 kHz (=2 subcarriers) | 6 | 0.078 |
| 460 | 330 kHz (=22 subcarriers) | 5 | 0.86 |
| −460 | 315 kHz (=21 subcarriers) | 5 | 0.82 |
| −440 | 15 kHz (=1 subcarriers) | 6 | 0.039 |

TABLE 6

Using NR guard band for deploying LTE-M (20 MHz NR channel bandwidth)

| Index of NR subcarrier (relative to NR raster) for placing LTE-M carrier center | Amount of NR guard band occupied by LTE-M (ω) [kHz] | Number of NR resource blocks (in transmission band) used for LTE-M (N) | Portion of the NR guard band used for LTE-M |
|---|---|---|---|
| 620 | 300 kHz (=20 subcarriers) | 5 | 0.66 |
| −620 | 285 kHz (=19 subcarriers) | 5 | 0.63 |

TABLE 7

Using NR guard band for deploying LTE-M (25 MHz NR channel bandwidth)

| Index of NR subcarrier (relative to NR raster) for placing LTE-M carrier center | Amount of NR guard band occupied by LTE-M (ω) [kHz] | Number of NR resource blocks (in transmission band) used for LTE-M (N) | Portion of the NR guard band used for LTE-M |
|---|---|---|---|
| 780 | 270 kHz (=18 subcarriers) | 5 | 0.51 |
| −780 | 255 kHz (=17 subcarriers) | 5 | 0.49 |

TABLE 8

Using NR guard band for deploying LTE-M (30 MHz NR channel bandwidth)

| Index of NR subcarrier (relative to NR raster) for placing LTE-M carrier center | Amount of NR guard band occupied by LTE-M (ω) [kHz] | Number of NR resource blocks (in transmission band) used for LTE-M (N) | Portion of the NR guard band used for LTE-M |
|---|---|---|---|
| 940 | 240 kHz (=16 subcarriers) | 5 | 0.405 |
| 960 | 540 (=36 subcarriers) | 3 | 0.911 |
| −960 | 525 kHz (=35 subcarriers) | 4 | 0.88 |
| −940 | 225 kHz (=15 subcarriers) | 5 | 0.38 |

TABLE 9

Using NR guard band for deploying LTE-M (40 MHz NR channel bandwidth)

| Index of NR subcarrier (relative to NR raster) for placing LTE-M carrier center | Amount of NR guard band occupied by LTE-M (ω) [kHz] | Number of NR resource blocks (in transmission band) used for LTE-M (N) | Portion of the NR guard band used for LTE-M |
|---|---|---|---|
| 1280 | 300 kHz (=20 subcarriers) | 5 | 0.543 |
| −1280 | 285 kHz (=19 subcarriers) | 5 | 0.515 |

TABLE 10

Using NR guard band for deploying LTE-M (50 MHz NR channel bandwidth)

| Index of NR subcarrier (relative to NR raster) for placing LTE-M carrier center | Amount of NR guard band occupied by LTE-M (ω) [kHz] | Number of NR resource blocks (in transmission band) used for LTE-M (N) | Portion of the NR guard band used for LTE-M |
|---|---|---|---|
| 1600 | 240 kHz (=16 subcarriers) | 5 | 0.346 |
| 1620 | 540 kHz (=36 subcarriers) | 3 | 0.78 |
| −1620 | 525 kHz (=35 subcarriers) | 4 | 0.758 |
| −1600 | 225 kHz (=15 subcarriers) | 5 | 0.325 |

Finally, based on the results given in Tables 3 through 10, for various NR channel bandwidths, the maximum resource efficiency in coexistence with LTE-M can be computed. Here, the resource efficiency (γ) is defined as follows:

$$\gamma = 100 \times \left[1 - \frac{\text{Number of } NR \text{ resource blocks (in transmission band) used for } LTE\text{-}M}{\text{Total number of } NR \text{ resource blocks}}\right].$$

In Table 11, the maximum resource efficiency in NR and LTE-M coexistence is provided for various NR channel bandwidths. Note that, without using the NR guard band, 7 NR RBs needs to be reserved for the LTE-M. In the last column of Table 11, the resource efficiency for a classical case is shown in which 7 NR RBs are reserved for the LTE-M.

TABLE 11

Resource efficiency in NR and LTE-M coexistence for various NR channel bandwidths.

| NR transmission bandwidth and the number of RBs ($N_{RB}$) for 15 kHz subcarrier spacing | Index of NR subcarrier (relative to NR raster) for placing LTE-M carrier center | Maximum resource efficiency | Resource efficiency for classical approach (7 NR RBs reservation) |
|---|---|---|---|
| 5 MHz, $N_{RB}$ = 25 | 120, −120 | 76% (N = 6) | 72% |
| 10 MHz, $N_{RB}$ = 52 | 280, −280 | 88.5% (N = 6) | 86.5% |
| 15 MHz, $N_{RB}$ = 79 | 460, −460 | 93.6% (N = 5) | 91.1% |
| 20 MHz, $N_{RB}$ = 106 | 620, −620 | 95.3% (N = 5) | 93.3% |
| 25 MHz, $N_{RB}$ = 133 | 780, −780 | 96.2% (N = 5) | 94.7% |
| 30 MHz, $N_{RB}$ = 160 | 960 | 98.12% (N = 3) | 95.6% |

TABLE 11-continued

Resource efficiency in NR and LTE-M coexistence for various NR channel bandwidths.

| NR transmission bandwidth and the number of RBs ($N_{RB}$) for 15 kHz subcarrier spacing | Index of NR subcarrier (relative to NR raster) for placing LTE-M carrier center | Maximum resource efficiency | Resource efficiency for classical approach (7 NR RBs reservation) |
|---|---|---|---|
| 40 MHz, $N_{RB}$ = 216 | 1280, −1280 | 97.7% (N = 5) | 96.7% |
| 50 MHz, $N_{RB}$ = 270 | 1620 | 98.9% (N = 3) | 97.4% |

Figure 4:
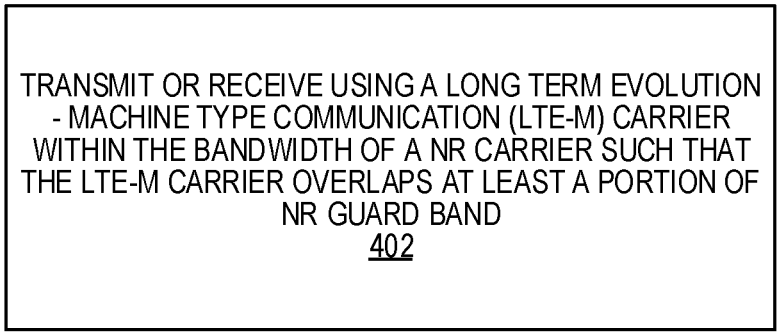
FIG. 4 illustrates a flow diagram of a method that may be used by network devices, according to some embodiments.

FIG. 4 illustrates a method for communicating in a wireless communication network that includes transmitting or receiving using an LTE-M carrier within the bandwidth of a NR carrier such that the LTE-M carrier overlaps at least a portion of NR guard band (block 402). The transmitting or receiving may be subject to aligning subcarriers in LTE-M and NR on the same grid and subject to raster placement. The LTE-M carrier may be positioned within the NR carrier so as to minimize the number of NR resource blocks occupied by the LTE-M carrier.

The center of the LTE-M carrier may be positioned in relation to NR bandwidth, considering 15 kHz subcarrier spacing, in positions identified in the tables above. A consolidated table, representative of positions in the tables above is provided here as Table 12. The LTE-M carrier may be positioned according to this table.

TABLE 12

LTE-M carrier center positions for various NR channel bandwidths.

| NR bandwidth [MHz] | Position(s) of the LTE-M carrier center, in subcarriers relative to the NR carrier raster |
|---|---|
| 5 | 120, −120 |
| 10 | 280, −280 |
| 15 | 440, 460, −460, −440 |
| 20 | 620, −620 |
| 25 | 780, −780 |
| 30 | 940, 960, −960, −940 |
| 40 | 1280, −1280 |
| 50 | 1600, 1620, −1620, −1600 |

The LTE-M carrier may be positioned for high resource efficiency according to table 11, which is simplified as Table 13.

TABLE 13

Simplified table for resource efficiency in NR and LTE-M

| NR bandwidth [MHz] | Position(s) of the LTE-M carrier center, in subcarriers relative to the NR raster |
|---|---|
| 5 | 120, −120 |
| 10 | 280, −280 |
| 15 | 460, −460 |
| 20 | 620, −620 |
| 25 | 780, −780 |
| 30 | 960 |
| 40 | 1280, −1280 |
| 50 | 1620 |

Network devices may use the LTE-M carrier center positions in NR bandwidth. As explained above, the relationship between LTE-M and NR can be explained as follows. NR and LTE-M subcarrier alignment may occur according to the equation:

$$100m + 15k = 100n,$$

where 100m kHz represents the possible frequencies of NR raster, 15 kHz represents NR subcarrier spacing and 100n kHz represents where the LTE-M carrier center is able to be placed, and where m and n are integers and k is an NR subcarrier index.

The LTE-M carrier center may be positioned relative to the center frequency C of the NR carrier represented by:

$$C = 15k + 7.5 \text{ kHz},$$

where k is an index of an NR subcarrier on which the LTE-M carrier center is able be placed. The minimum L and maximum U frequencies of the LTE-M carrier, relative to the NR carrier center frequency C may be given by:

$$L = C - \frac{B_{LT}}{2} = 15k + 7.5 - \frac{B_{LT}}{2} \text{ kHz; and}$$

$$U = C + \frac{B_{LT}}{2} = 15k + 7.5 + \frac{B_{LT}}{2} \text{ kHz},$$

where $B_{LT}$ represents operational bandwidth for LTE-M. The LTE-M carrier center may be positioned with respect to the NR carrier according to one of the following equations:

$$\frac{(1-\alpha)B_{nr} - B_{LT} - 15}{30} \leq k \leq \frac{B_{nr} - B_{LT} - 15}{30}$$

for the right side of the NR carrier; and $$\frac{B_{LT} - B_{nr} - 15}{30} < k \leq \frac{B_{LT} - (1-\alpha)B_{nr} - 15}{30}$$

for the left side of the NR carrier, where $B_{LT}$ represents operational bandwidth for LTE-M, $B_{nr}$ represents a channel bandwidth of the NR carrier and $\alpha$ represents a portion of the NR carrier that is used for a guard band on both sides.

In some embodiments, the number of NR resource blocks reserved for the transmitting or receiving may correspond to the LTE-M carrier center and a channel bandwidth size of the NR carrier. The number N of NR resource blocks may be reserved according to the following equation:

$$N = \left\lceil \frac{B_{LT} - \omega}{180} \right\rceil,$$

where $B_{LT}$ represents operational bandwidth for LTE-M and $\omega$ represents the amount of the NR guard band occupied by the LTE-M carrier. The variable ω may be maximized to reduce the number N of the NR resource blocks needed for deploying the LTE-M carrier.

The network devices may utilize the LTE-M carrier center positions in coexistence with NR bandwidth, as described above, when communicating with other devices or nodes. Examples of such network devices includes network nodes and wireless devices as described below.

Figure 5:
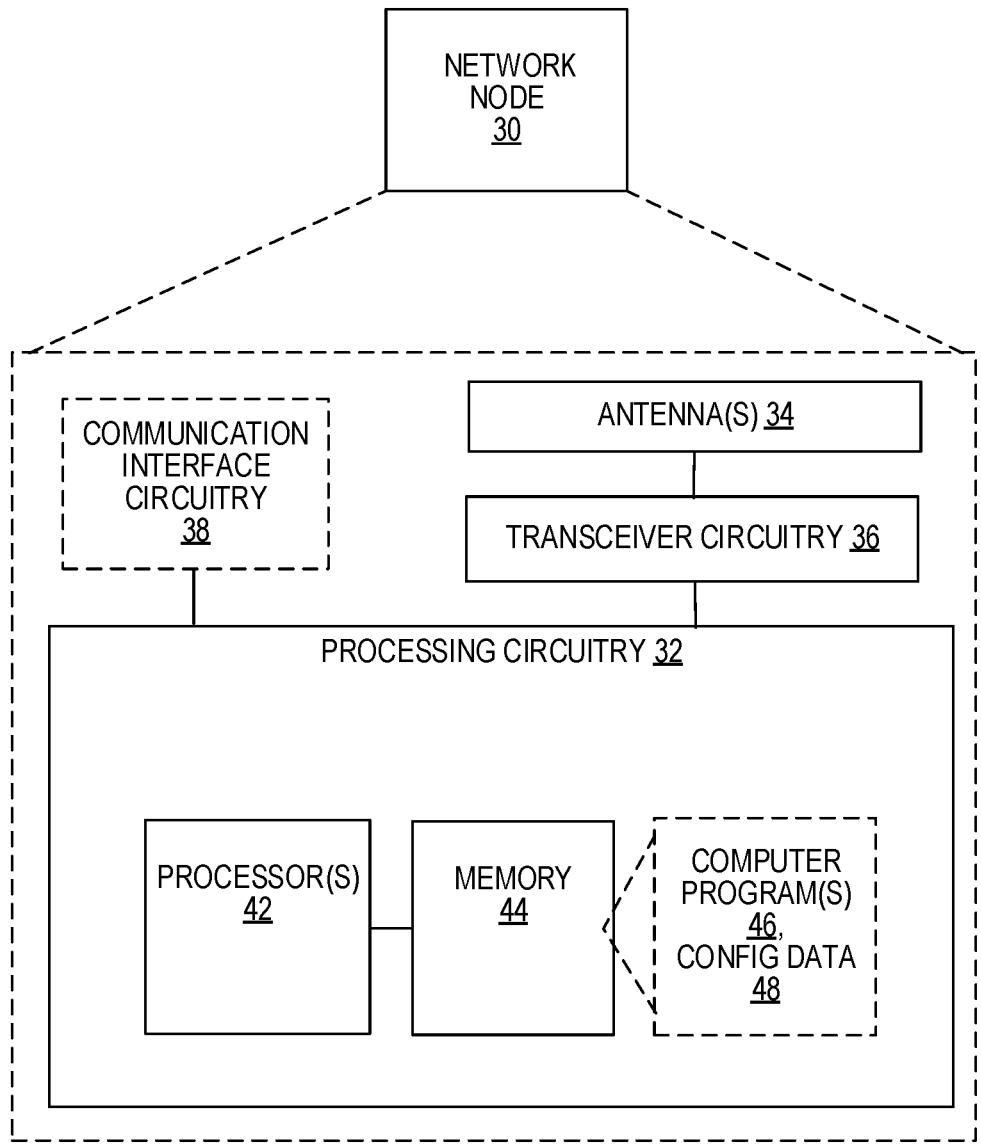
FIG. 5 illustrates a block diagram of a network device that is a network node, according to some embodiments.

FIG. 5 shows an example network node 30 that may be configured to carry out one or more of these disclosed techniques. Network node 30 may be an evolved Node B (eNodeB), Node B or gNB. While a network node 30 is shown in FIG. 2, the operations can be performed by other kinds of network access nodes, including a radio network node such as base station, radio base station, base transceiver station, base station controller, network controller, NR BS, Multi-cell/multicast Coordination Entity (MCE), relay node, access point, radio access point, Remote Radio Unit (RRU) Remote Radio Head (RRH), or a multi-standard BS (MSR BS). Network node 30 may also, in some cases, be a core network node (e.g., MME, SON node, a coordinating node, positioning node, MDT node, etc.), or even an external node (e.g., 3rd party node, a node external to the current network), etc. Network node 30 may also comprise test equipment.

In the non-limiting embodiments described below, network node 30 will be described as being configured to operate as a cellular network access node in an LTE network or NR network. In some embodiments, the technique can be implemented in the RRC layer. The RRC layer could be implemented by one or more network nodes in a cloud environment and hence some embodiments can be implemented in a cloud environment.

Those skilled in the art will readily appreciate how each type of node may be adapted to carry out one or more of the methods and signaling processes described herein, e.g., through the modification of and/or addition of appropriate program instructions for execution by processing circuits 32.

Network node 30 facilitates communication between wireless terminals (e.g., UEs), other network access nodes and/or the core network. Network node 30 may include communication interface circuitry 38 that includes circuitry for communicating with other nodes in the core network, radio nodes, and/or other types of nodes in the network for the purposes of providing data and/or cellular communication services. Network node 30 communicates with wireless devices using antennas 34 and transceiver circuitry 36. Transceiver circuitry 36 may include transmitter circuits, receiver circuits, and associated control circuits that are collectively configured to transmit and receive signals according to a radio access technology, for the purposes of providing cellular communication services.

Network node 30 also includes one or more processing circuits 32 that are operatively associated with the transceiver circuitry 36 and, in some cases, the communication interface circuitry 38. Processing circuitry 32 comprises one or more digital processors 42, e.g., one or more microprocessors, microcontrollers, Digital Signal Processors (DSPs), Field Programmable Gate Arrays (FPGAs), Complex Programmable Logic Devices (CPLDs), Application Specific Integrated Circuits (ASICs), or any mix thereof. More generally, processing circuitry 32 may comprise fixed circuitry, or programmable circuitry that is specially configured via the execution of program instructions implementing the functionality taught herein, or some mix of fixed and programmed circuitry. Processor 42 may be multi-core, i.e., having two or more processor cores utilized for enhanced performance, reduced power consumption, and more efficient simultaneous processing of multiple tasks.

Processing circuitry 32 also includes a memory 44. Memory 44, in some embodiments, stores one or more computer programs 46 and, optionally, configuration data 48. Memory 44 provides non-transitory storage for the computer program 46 and it may comprise one or more types of computer-readable media, such as disk storage, solid-state memory storage, or any mix thereof. Here, "non-transitory" means permanent, semi-permanent, or at least temporarily persistent storage and encompasses both long-term storage in non-volatile memory and storage in working memory, e.g., for program execution. By way of non-limiting example, memory 44 comprises any one or more of SRAM, DRAM, EEPROM, and FLASH memory, which may be in processing circuitry 32 and/or separate from processing circuitry 32. Memory 44 may also store any configuration data 48 used by the network access node 30. Processing circuitry 32 may be configured, e.g., through the use of appropriate program code stored in memory 44, to carry out one or more of the methods and/or signaling processes detailed hereinafter.

Processing circuitry 32 of the network node 30 is configured, according to some embodiments, to perform the techniques described herein for one or more network nodes of a wireless communication system serving a plurality of UEs, such as for network node 110 illustrated in FIG. 1. Processing circuitry 32 is configured to transmit or receive using an LTE-M carrier within the bandwidth of an NR carrier such that the LTE-M carrier overlaps at least a portion of NR guard band. As described above, the transmitting or receiving may be subject to aligning subcarriers in LTE-M and NR on the same grid and subject to raster placement. The LTE-M carrier may be positioned within the NR carrier so as to minimize the number of NR resource blocks occupied by the LTE-M carrier. Processing circuitry 32 is configured to transmit or receive according to the other LTE-M/NR relational details described above. Processing circuitry 32 is also configured to perform method 400, according to some embodiments.

Figure 6:
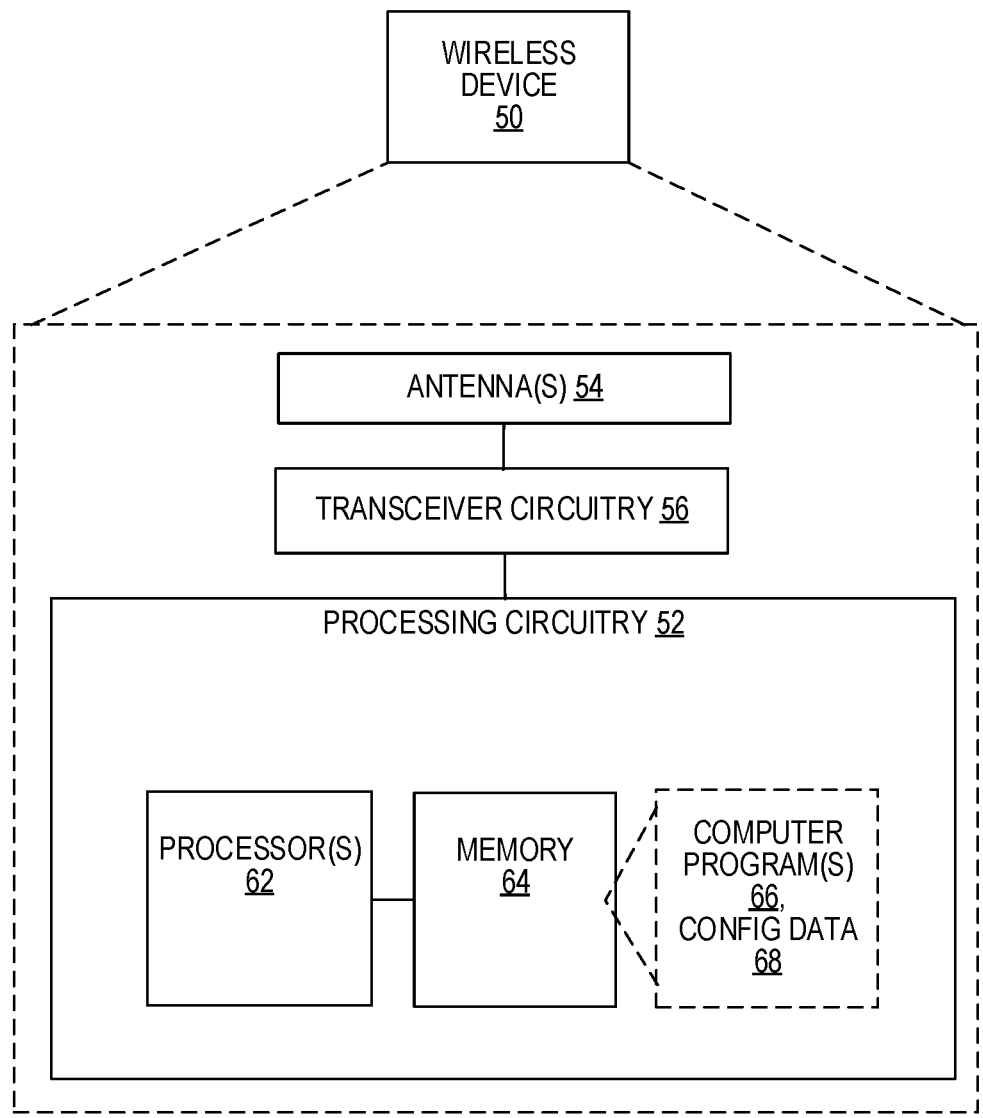
FIG. 6 illustrates is a block diagram of a network device that is a wireless device, according to some embodiments.

FIG. 6 illustrates a diagram of a wireless device 50 configured to carry out the techniques described above, according to some embodiments. Wireless device 50 may be considered to represent any wireless devices or terminals that may operate in a network, such as a UE in a cellular network. Other examples may include a communication device, target device, MTC device, IoT device, device to device (D2D) UE, machine type UE or UE capable of machine to machine communication (M2M), a sensor equipped with UE, PDA (personal digital assistant), tablet, IPAD tablet, mobile terminal, smart phone, laptop embedded equipped (LEE), laptop mounted equipment (LME), USB dongles, Customer Premises Equipment (CPE), etc.

Wireless device 50 is configured to communicate with a network node or base station in a wide-area cellular network via antennas 54 and transceiver circuitry 56. Transceiver circuitry 56 may include transmitter circuits, receiver circuits, and associated control circuits that are collectively configured to transmit and receive signals according to a radio access technology, for the purposes of using cellular communication services. This radio access technologies can be NR and LTE for the purposes of this discussion.

Wireless device 50 also includes one or more processing circuits 52 that are operatively associated with the radio transceiver circuitry 56. Processing circuitry 52 comprises one or more digital processing circuits, e.g., one or more microprocessors, microcontrollers, DSPs, FPGAs, CPLDs, ASICs, or any mix thereof. More generally, processing circuitry 52 may comprise fixed circuitry, or programmable circuitry that is specially adapted via the execution of program instructions implementing the functionality taught herein, or may comprise some mix of fixed and programmed circuitry. Processing circuitry 52 may be multi-core.

Processing circuitry 52 also includes a memory 64. Memory 64, in some embodiments, stores one or more computer programs 66 and, optionally, configuration data 68. Memory 64 provides non-transitory storage for computer program 66 and it may comprise one or more types of computer-readable media, such as disk storage, solid-state memory storage, or any mix thereof. By way of non-limiting example, memory 64 comprises any one or more of SRAM, DRAM, EEPROM, and FLASH memory, which may be in processing circuitry 52 and/or separate from processing circuitry 52. Memory 64 may also store any configuration data 68 used by wireless device 50. Processing circuitry 52 may be configured, e.g., through the use of appropriate program code stored in memory 64, to carry out one or more of the methods and/or signaling processes detailed hereinafter.

Processing circuitry 52 of wireless device 50 is configured, according to some embodiments, to transmit or receive using an LTE-M carrier within the bandwidth of an NR carrier such that the LTE-M carrier overlaps at least a portion of NR guard band, as described herein. Processing circuitry 52 may also be configured to perform method 400.

Figure 7:
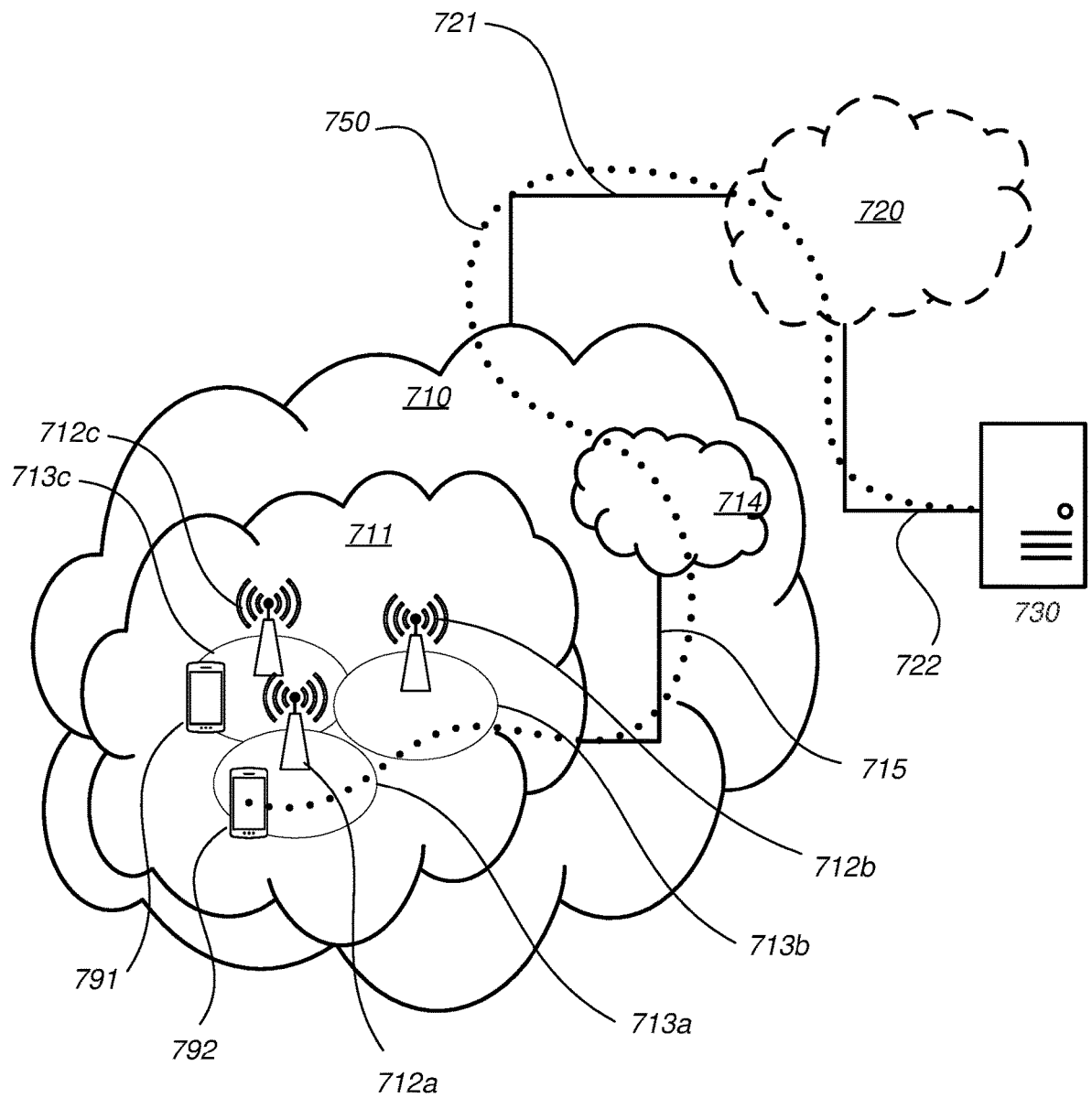
FIG. 7 schematically illustrates a telecommunication network connected via an intermediate network to a host computer, according to some embodiments.

FIG. 7, according to some embodiments, illustrates a communication system that includes a telecommunication network 710, such as a 3GPP-type cellular network, which comprises an access network 711, such as a radio access network, and a core network 714. The access network 711 comprises a plurality of base stations 712a, 712b, 712c, such as NBs, eNBs, gNBs or other types of wireless access points, each defining a corresponding coverage area 713a, 713b, 713c. Each base station 712a, 712b, 712c is connectable to the core network 714 over a wired or wireless connection 715. A first UE 771 located in coverage area 713c is configured to wirelessly connect to, or be paged by, the corresponding base station 712c. A second UE 792 in coverage area 713a is wirelessly connectable to the corresponding base station 712a. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. The connections 721, 722 between the telecommunication network 710 and the host computer 730 may extend directly from the core network 714 to the host computer 730 or may go via an optional intermediate network 720. The intermediate network 720 may be one of, or a combination of more than one of, a public, private or hosted network; the intermediate network 720, if any, may be a backbone network or the Internet; in particular, the intermediate network 720 may comprise two or more subnetworks (not shown).

The communication system of FIG. 7 as a whole enables connectivity between one of the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, a base station 712 may not or need not be informed about the past routing of an incoming downlink communication with data originating from a host computer 730 to be forwarded (e.g., handed over) to a connected UE 791. Similarly, the base station 712 need not be aware of the future routing of an outgoing uplink communication originating from the UE 791 towards the host computer 730.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as a UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with a UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

Figure 8:
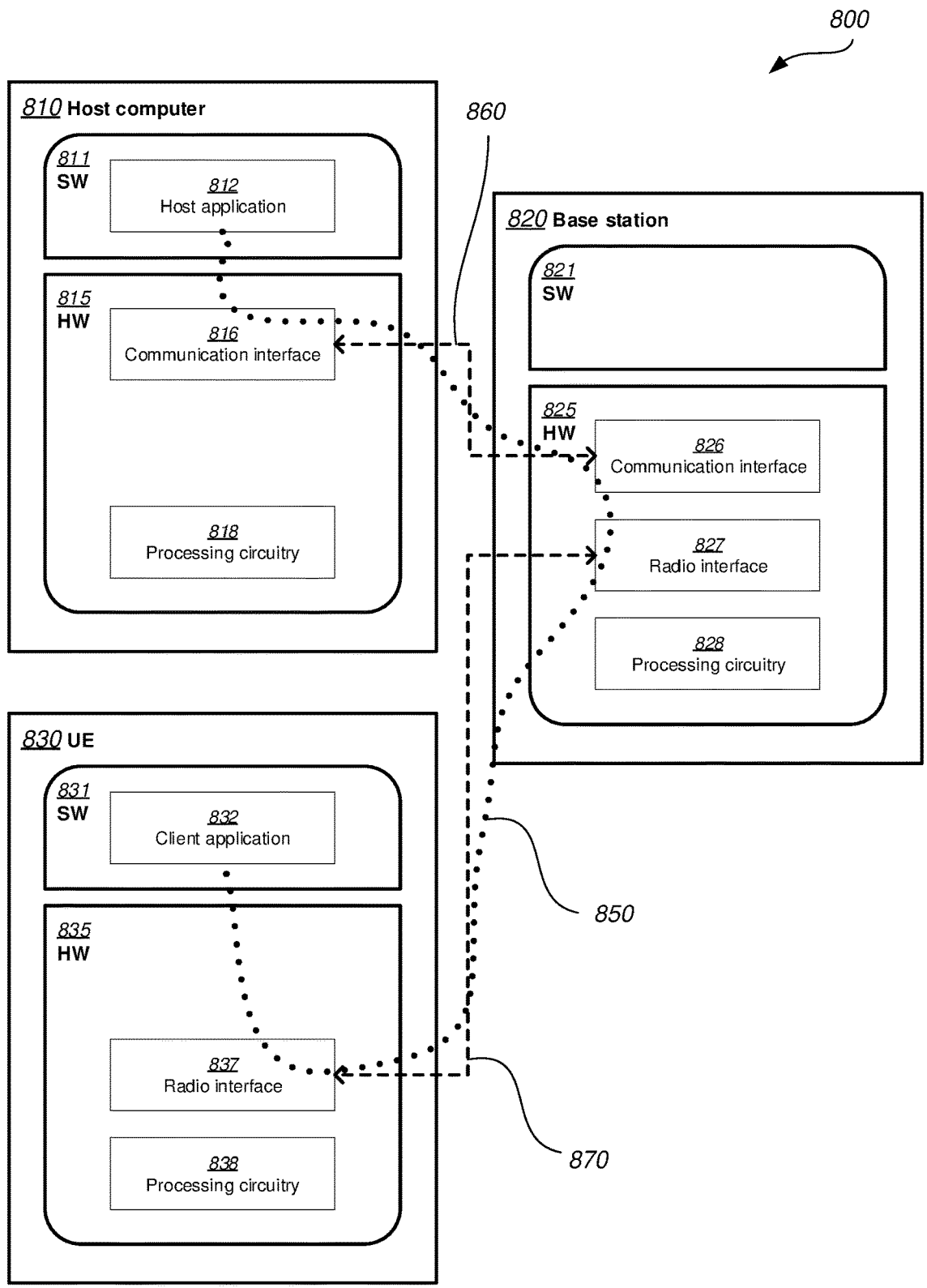
FIG. 8 is a generalized block diagram of a host computer communicating via a base station with a user equipment over a partially wireless connection, according to some embodiments.

It is noted that the host computer 810, base station 820 and UE 830 illustrated in FIG. 8 may be identical to the host computer 730, one of the base stations 712a, 712b, 712c and one of the UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the use equipment 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

The wireless connection 870 between the UE 830 and the base station 820 is in accordance with the teachings of the embodiments described throughout this disclosure, such as provided by nodes such as wireless device 50 and network node 30, along with the corresponding method 400. The embodiments described herein provide for the effective deployment of LTE-M in coexistence with NR. More specially, the embodiments address problems of subcarrier grid alignment and resource efficiency, which are the key issues in the coexistence of NR and LTE-M. The teachings of these embodiments may improve the data rate, capacity, latency and/or power consumption for the network and UE 830 using the OTT connection 850 for emergency warning systems and thereby provide benefits such as more efficient and targeted emergency messaging that saves on network and UE resources while improving the ability of users to take safe action.

A measurement procedure may be provided for the purpose of monitoring data rate, latency and other factors on which the one or more embodiments improve. There may further be an optional network functionality for reconfiguring the OTT connection 850 between the host computer 810 and UE 830, in response to variations in the measurement results. The measurement procedure and/or the network functionality for reconfiguring the OTT connection 850 may be implemented in the software 811 of the host computer 810 or in the software 831 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer's 810 measurements of throughput, propagation times, latency and the like. The measurements may be implemented in that the software 811, 831 causes messages to be transmitted, in particular empty or 'dummy' messages, using the OTT connection 850 while it monitors propagation times, errors etc.

FIG. 9 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 9 will be included in this section. In a first step 910 of the method, the host computer provides user data. In an optional substep 911 of the first step 910, the host computer provides the user data by executing a host application. In a second step 920, the host computer initiates a transmission carrying the user data to the UE. In an optional third step 930, the base station transmits to the UE the user data which was carried in the transmission that the host computer initiated, in accordance with the teachings of the embodiments described throughout this disclosure. In an optional fourth step 940, the UE executes a client application associated with the host application executed by the host computer.

FIG. 10 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 10 will be included in this section. In a first step 1010 of the method, the host computer provides user data. In an optional substep (not shown) the host computer provides the user data by executing a host application. In a second step 1020, the host computer initiates a transmission carrying the user data to the UE. The transmission may pass via the base station, in accordance with the teachings of the embodiments described throughout this disclosure. In an optional third step 1030, the UE receives the user data carried in the transmission.

FIG. 11 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 11 will be included in this section. In an optional first step 1110 of the method, the UE receives input data provided by the host computer. Additionally, or alternatively, in an optional second step 1120, the UE provides user data. In an optional substep 1121 of the second step 1120, the UE provides the user data by executing a client application. In a further optional substep 1111 of the first step 1110, the UE executes a client application which provides the user data in reaction to the received input data provided by the host computer. In providing the user data, the executed client application may further consider user input received from the user. Regardless of the specific manner in which the user data was provided, the UE initiates, in an optional third substep 1130, transmission of the user data to the host computer. In a fourth step 1140 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station and a UE which may be those described with reference to FIGS. 7 and 8. For simplicity of the present disclosure, only drawing references to FIG. 12 will be included in this section. In an optional first step 1210 of the method, in accordance with the teachings of the embodiments described throughout this disclosure, the base station receives user data from the UE. In an optional second step 1220, the base station initiates transmission of the received user data to the host computer. In a third step 1230, the host computer receives the user data carried in the transmission initiated by the base station.

As discussed in detail above, the techniques described herein, e.g., as illustrated in the process flow diagrams of FIG. 4, may be implemented, in whole or in part, using computer program instructions executed by one or more processors. It will be appreciated that a functional implementation of these techniques may be represented in terms of functional modules, where each functional module corresponds to a functional unit of software executing in an appropriate processor or to a functional digital hardware circuit, or some combination of both.

Figure 13:
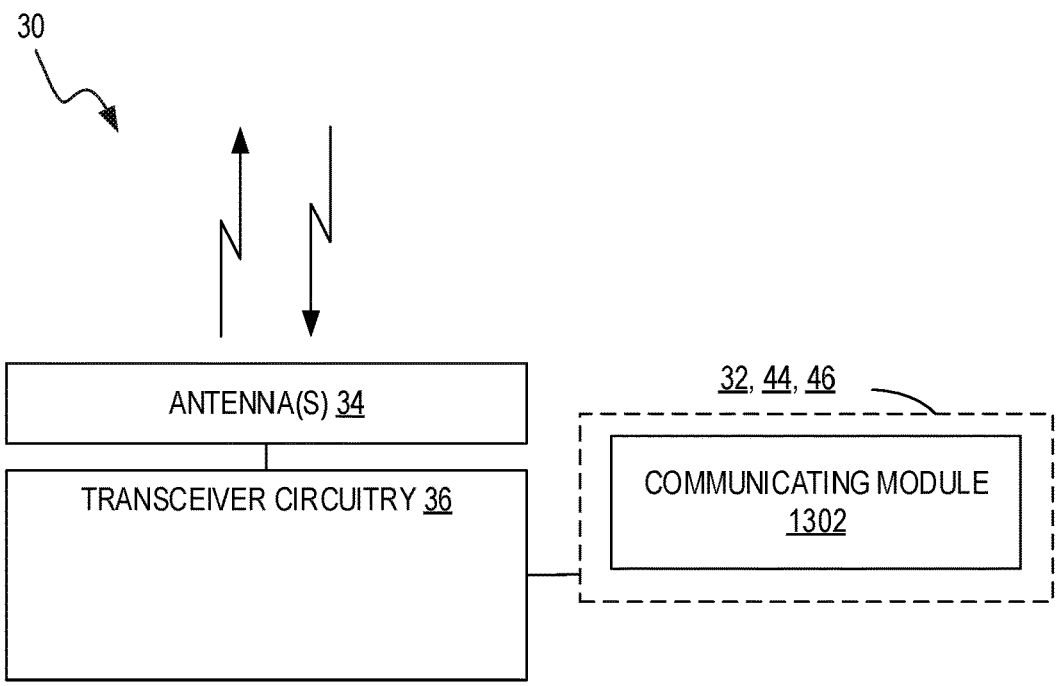
FIG. 13 is a block diagram illustrating a functional implementation of a network node, according to some embodiments.

FIG. 13 illustrates an example functional module or circuit architecture for a network node, such as network node 30. The functional implementation includes a communicating module 1302 for transmitting or receiving using LTE-M carrier within the bandwidth of an NR carrier such that the LTE-M carrier overlaps at least a portion of NR guard band.

Figure 14:
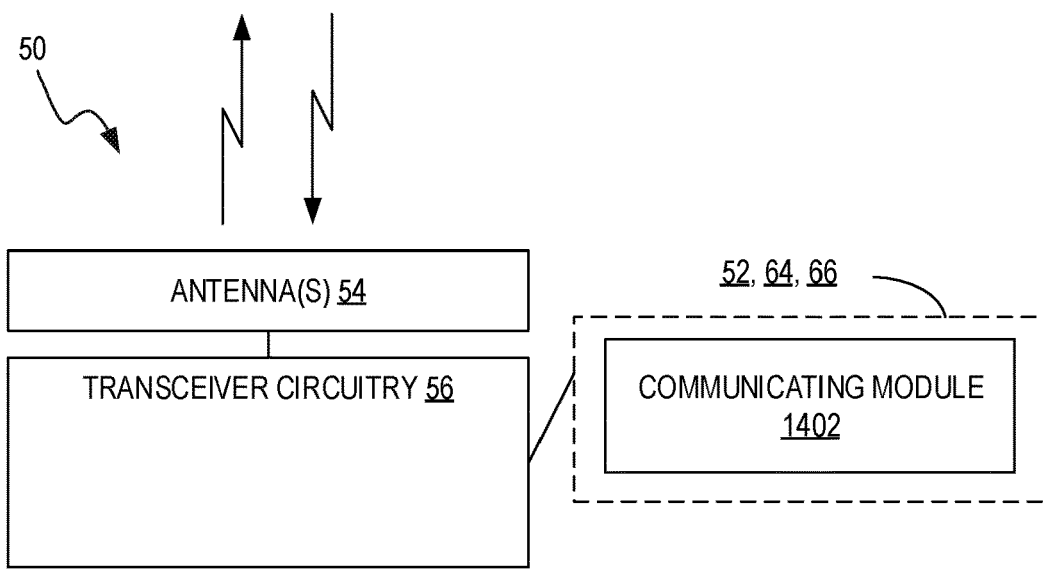
FIG. 14 is a block diagram illustrating a functional implementation of a wireless device, according to some embodiments.

FIG. 14 illustrates an example functional module or circuit architecture for wireless device 50 that includes a communicating module 1402 for transmitting or receiving using LTE-M carrier within the bandwidth of an NR carrier such that the LTE-M carrier overlaps at least a portion of NR guard band.

EXAMPLE EMBODIMENTS

Example embodiments can include, but are not limited to, the following enumerated examples:

Example Embodiment 1. A method for communicating in a wireless communication network, comprising: transmitting or receiving using a Long Term Evolution-Machine Type Communication (LTE-M) carrier within the bandwidth of a New Radio (NR) carrier such that the LTE-M carrier overlaps at least a portion of NR guard band.

Example Embodiment 2. The method of example embodiment 1, wherein the transmitting or receiving is subject to aligning subcarriers in LTE-M and NR on the same grid and subject to raster placement.

Example Embodiment 3. The method of example embodiment 1 or 2, wherein the LTE-M carrier is positioned within the NR carrier so as to minimize the number of NR resource blocks occupied by the LTE-M carrier.

Example Embodiment 4. The method of any of example embodiments 1-3, wherein the center of the LTE-M carrier is positioned in relation to NR bandwidth, considering 15 kHz subcarrier spacing, according to the following table:

| NR bandwidth [MHz] | Position(s) of the LTE-M carrier center, in subcarriers relative to the NR carrier raster |
|---|---|
| 5 | 120, −120 |
| 10 | 280, −280 |
| 15 | 440, 460, −460, −440 |
| 20 | 620, −620 |
| 25 | 780, −780 |
| 30 | 940, 960, −960, −940 |
| 40 | 1280, −1280 |
| 50 | 1600, 1620, −1620, −1600 |

Example Embodiment 5. The method of any of example embodiments 1-3, wherein the center of the LTE-M carrier is positioned in relation to NR bandwidth, according to the following table:

| NR bandwidth [MHz] | Position(s) of the LTE-M carrier center, in subcarriers relative to the NR raster |
|---|---|
| 5 | 120, −120 |
| 10 | 280, −280 |
| 15 | 460, −460 |
| 20 | 620, −620 |
| 25 | 780, −780 |
| 30 | 960 |
| 40 | 1280, −1280 |
| 50 | 1620 |

Example Embodiment 6. The method of example embodiment 1 or 2, wherein NR and LTE-M subcarrier alignment occurs according to the equation:

$$100m+15k=100n,$$

where 100m kHz represents the possible frequencies of NR raster, 15 kHz represents NR subcarrier spacing and 100n kHz represents where the LTE-M carrier center is able to be placed, and where m and n are integers and k is an NR subcarrier index.

Example Embodiment 7. The method of any of example embodiments 1-6, wherein the LTE-M carrier center is positioned relative to the center frequency C of the NR carrier represented by:

$$C=15k+7.5 \text{ kHz},$$

where k is an index of an NR subcarrier on which the LTE-M carrier center is able be placed.

Example Embodiment 8. The method of example embodiment 7, wherein the minimum L and maximum U frequencies of the LTE-M carrier, relative to the NR carrier center frequency C are given by:

$$L = C - \frac{B_{LT}}{2} = 15k + 7.5 - \frac{B_{LT}}{2} \text{ kHz; and}$$

$$U = C + \frac{B_{LT}}{2} = 15k + 7.5 + \frac{B_{LT}}{2} \text{ kHz,}$$

Example Embodiment 9. The method of example embodiment 7 or 8, wherein the LTE-M carrier center is positioned with respect to the NR carrier according to one of the following equations:

$$\frac{(1-\alpha)B_{nr}-B_{LT}-15}{30} \le k \le \frac{B_{nr}-B_{LT}-15}{30}$$

for the right side of the NR carrier; and $$\frac{B_{LT}-B_{nr}-15}{30} < k \le \frac{B_{LT}-(1-\alpha)B_{nr}-15}{30}$$

for the left side of the NR carrier,
where $B_{LT}$ represents operational bandwidth for LTE-M, $B_{nr}$ represents a channel bandwidth of the NR carrier and $\alpha$ represents a portion of the NR carrier that is used for a guard band on both sides.

Example Embodiment 10. The method of any of example embodiments 1-9, wherein the number of NR resource blocks reserved for the transmitting or receiving correspond to the LTE-M carrier center and a channel bandwidth size of the NR carrier.

Example Embodiment 11. The method of example embodiment 10, wherein the number N of NR resource blocks are reserved according to the following equation:

$$N = \left\lceil \frac{B_{LT}-\omega}{180} \right\rceil,$$

where $B_{LT}$ represents operational bandwidth for LTE-M and $\omega$ represents the amount of the NR guard band occupied by the LTE-M carrier.

Example Embodiment 12. The method of example embodiment 11, wherein $\omega$ is maximized to reduce the number N of the NR resource blocks needed for deploying the LTE-M carrier.

Example Embodiment 13. A network node adapted to perform the methods of any of example embodiments 1-12.

Example Embodiment 14. A network node comprising transceiver circuitry and processing circuitry operatively associated with the transceiver circuitry and configured to perform the methods of any of example embodiments 1-12.

Example Embodiment 15. A user equipment adapted to perform the methods of any of example embodiments 1-12.

Example Embodiment 16. A user equipment comprising transceiver circuitry and processing circuitry operatively associated with the transceiver circuitry and configured to perform the methods of any of example embodiments 1-12.

Example Embodiment 17. A computer program comprising instructions that, when executed on at least one processing circuit, cause the at least one processing circuit to carry out the method according to any one of example embodiments 1-12.

Example Embodiment 18. A carrier containing the computer program of example embodiment 17, wherein the carrier is one of an electronic signal, optical signal, radio signal, or computer readable storage medium.

Example Embodiment 19. A communication system including a host computer comprising:
processing circuitry configured to provide user data; and
a communication interface configured to forward the user data to a cellular network for transmission to a user equipment (UE), wherein the cellular network comprises a base station having a radio interface and processing circuitry, the base station's processing circuitry configured to perform any of the operations comprising embodiments 1-12.

Example Embodiment 20. The communication system of the previous embodiment further including the base station.

Example Embodiment 21. The communication system of the previous two embodiments, further including the UE.

Example Embodiment 22. The communication system of the previous three embodiments, wherein:
the processing circuitry of the host computer is configured to execute a host application, thereby providing the user data; and
the UE's processing circuitry is further configured to execute a client application associated with the host application.

Example Embodiment 23. A communication system including a host computer comprising a communication interface configured to receive user data originating from a transmission from a User equipment (UE) to a base station, the base station comprising a radio interface and processing circuitry configured to communicate with the base station and cooperatively perform operations of any of embodiments 1-12.

Example Embodiment 24. The communication system of the previous embodiment further including the base station.

Example Embodiment 25. The communication system of the previous two embodiments, further including the UE.

Example Embodiment 26. The communication system of the previous three embodiments, wherein:
the processing circuitry of the host computer is configured to execute a host application; and
the UE is further configured to execute a client application associated with the host application, thereby providing the user data to be received by the host computer.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts is to be determined by the broadest permissible interpretation of the present disclosure including the examples of embodiments and their equivalents, and shall not be restricted or limited by the foregoing detailed description.

What is claimed is:
1. A method for communicating in a wireless communication network, the method comprising:
determining candidate locations for a Long Term Evolution-Machine Type Communication (LTE-M) carrier from among multiple LTE carrier locations based on where subcarriers of a New Radio (NR) carrier align with subcarriers of the LTE-M carrier;
determining, from the candidate locations, an LTE-M carrier center such that at least a portion of the LTE-M carrier deploys in a guard band of the NR carrier; and
transmitting or receiving using the LTE-M carrier according to the LTE-M carrier center, wherein the LTE-M carrier center is positioned relative to the center frequency C of the NR carrier represented by:

$C=15k+7.5$ kHz, where k is an index of an NR subcarrier on which the LTE-M carrier center is able be placed, and wherein the minimum L and maximum U frequencies of the LTE-M carrier, relative to the NR carrier center frequency C are given by:

$$L = C - \frac{B_{LT}}{2} = 15k + 7.5 - \frac{B_{LT}}{2} \text{ kHz; and}$$

$$U = C + \frac{B_{LT}}{2} = 15k + 7.5 + \frac{B_{LT}}{2} \text{ kHz,}$$

where $B_{LT}$ represents operational bandwidth for LTE-M.

2. The method of claim 1, wherein the transmitting or receiving is subject to aligning subcarriers in LTE-M and NR on the same grid and subject to raster placement.

3. The method of claim 1, wherein the center of the LTE-M carrier is positioned in relation to NR bandwidth, considering 15 kHz subcarrier spacing, according to the following table:

| NR bandwidth [MHz] | Position(s) of the LTE-M carrier center, in subcarriers relative to the NR carrier raster |
|---|---|
| 5 | 120, −120 |
| 10 | 280, −280 |
| 15 | 440, 460, −460, −440 |
| 20 | 620, −620 |
| 25 | 780, −780 |
| 30 | 940, 960, −960, −940 |
| 40 | 1280, −1280 |
| 50 | 1600, 1620, −1620, −1600 |

4. The method of claim 1, wherein the center of the LTE-M carrier is positioned in relation to NR bandwidth, according to the following table:

| NR bandwidth [MHz] | Position(s) of the LTE-M carrier center, in subcarriers relative to the NR raster |
|---|---|
| 5 | 120, −120 |
| 10 | 280, −280 |
| 15 | 460, −460 |
| 20 | 620, −620 |
| 25 | 780, −780 |
| 30 | 960 |
| 40 | 1280, −1280 |
| 50 | 1620 |

5. The method of claim 1, wherein NR and LTE-M subcarrier alignment occurs according to the equation:

100$m$+15$k$=100$n$, where 100m kHz represents the possible frequencies of NR raster, 15 kHz represents NR subcarrier spacing and 100n kHz represents where the LTE-M carrier center is able to be placed, and where m and n are integers and k is an NR subcarrier index.

6. The method of claim 1, wherein the LTE-M carrier center is positioned with respect to the NR carrier according to one of the following equations:

$$\frac{(1-\alpha)B_{nr} - B_{LT} - 15}{30} \leq k \leq \frac{B_{nr} - B_{LT} - 15}{30}$$

for the right side of the NR carrier; and $$\frac{B_{LT} - B_{nr} - 15}{30} < k \leq \frac{B_{LT} - (1-\alpha)B_{nr} - 15}{30}$$

for the left side of the NR carrier,
where $B_{LT}$ represents operational bandwidth for LTE-M, $B_{nr}$ represents a channel bandwidth of the NR carrier and α represents a portion of the NR carrier that is used for a guard band on both sides.

7. The method of claim 1, wherein the number of NR resource blocks reserved for the transmitting or receiving correspond to the LTE-M carrier center and a channel bandwidth size of the NR carrier.

8. The method of claim 7, wherein the number N of NR resource blocks are reserved according to the following equation:

$$N = \left\lceil \frac{B_{LT} - \omega}{180} \right\rceil,$$

where $B_{LT}$ represents operational bandwidth for LTE-M and ω represents the amount of the NR guard band occupied by the LTE-M carrier.

9. The method of claim 8, wherein ω is maximized to reduce the number N of the NR resource blocks needed for deploying the LTE-M carrier.

10. A network node comprising transceiver circuitry and processing circuitry operatively associated with the transceiver circuitry and configured to perform the methods of claim 1.

11. A user equipment comprising transceiver circuitry and processing circuitry operatively associated with the transceiver circuitry and configured to perform the methods of claim 1.

12. A non-transitory computer readable storage medium storing instructions that, when executed on at least one processing circuit, cause the at least one processing circuit to carry out the method according to claim 1.

* * * * *